United States Patent [19]

Prout et al.

[11] Patent Number: 5,261,562
[45] Date of Patent: Nov. 16, 1993

[54] BLOW-MOLDED CONTAINER WITH BLOW-MOLDED HANDLE

[75] Inventors: J. Timothy Prout, Winston Salem, N.C.; Ronald K. Raboin, De Pere, Wis.

[73] Assignee: Toter, Inc., Statesville, N.C.

[21] Appl. No.: 820,544

[22] Filed: Jan. 14, 1992

[51] Int. Cl.⁵ .............................. B65D 43/00
[52] U.S. Cl. ........................ 220/771; 220/908
[58] Field of Search ............. 220/771, 908, 752, 675

[56] References Cited

U.S. PATENT DOCUMENTS

| | | | |
|---|---|---|---|
| 4,450,976 | 5/1984 | Snyder et al. | 220/908 X |
| 4,733,804 | 3/1988 | Slat et al. | 220/675 X |
| 4,749,101 | 6/1988 | Durkan, Jr. | 220/908 X |
| 4,836,394 | 6/1989 | Glomski | 220/908 X |
| 4,930,649 | 6/1990 | Moser | 220/771 X |
| 4,969,571 | 11/1990 | Bartz | 220/771 |
| 5,088,750 | 2/1992 | Beese et al. | 220/908 X |
| 5,167,351 | 12/1992 | Prout et al. | 220/908 X |

Primary Examiner—Steven M. Pollard
Attorney, Agent, or Firm—W. Thad Adams, III

[57] ABSTRACT

A refuse container characterized by durability and light weight. The refuse container includes a lightweight blow-molded body, including integrally-formed bottom wall and side walls, the upper end of the side walls around the periphery thereof defining a mouth for receiving refuse, and for receiving and supporting a lid. An integrally-formed blow-molded handle extends outwardly from a rear side of the container adjacent the upper end thereof. The handle includes first and second spaced-apart hollow handle supports formed adjacent the side edges of the rear side of the container and a hollow handle bar integrally-formed with and extending between the first and second handle supports.

12 Claims, 19 Drawing Sheets

BLOW-MOLDED CONTAINER WITH BLOW-MOLDED HANDLE

TECHNICAL FIELD AND BACKGROUND OF THE INVENTION

This invention relates to a blow-molded container, such as a refuse container. Blow-molding as a method of forming large thermoplastic containers provides a number of significant advantages over other forming methods, such as injection molding. Blow-molding permits thinner wall thicknesses for a given-sized container. Therefore, a blow-molded container will generally require less raw material to produce than with other methods. This reduces raw material and energy requirements. The thinner wall thicknesses also result in a lighter weight container which is easier to roll and to lift, either manually or by means of lifting devices.

Many prior art containers have handles which are attached to the container after the container itself has been manufactured. These handles can break off and, in any event, require assembly. An integrally-formed handle provides greater product integrity, less susceptibility to damage, lighter weight and less expense in manufacture, assembly and maintenance. In addition, this design permits the container to be used without the lid, since the handle is part of the container body and not the lid assembly.

SUMMARY OF THE INVENTION

Therefore, it is an object of the invention to provide a container which has an integrally-formed, blow-molded handle means.

It is another object of the invention to provide a container which does not require assembly of a handle means after manufacture of the container itself.

It is another object of the invention to provide a container which product integrity, less susceptibility to damage, lighter weight and less expense in manufacture, assembly and maintenance.

These and other objects of the present invention are achieved in the preferred embodiments disclosed below by providing a refuse container characterized by durability and light weight, the refuse container comprising a lightweight blow-molded body, including integrally-formed bottom wall and side walls, the upper end of the side walls around the periphery thereof defining a mouth for receiving refuse, and for receiving and supporting a lid. An integrally-formed blow-molded handle means extends outwardly from a rear side of the container adjacent the upper end thereof.

According to one preferred embodiment of the invention, the handle means comprise first and second spaced-apart hollow handle supports formed adjacent the side edges of the rear side of the container and a hollow handle bar integrally-formed with and extending between the first and second handle supports.

According to another preferred embodiment of the invention, the container includes a supporting web extending between the rear wall of the container and the handle bar intermediate the first and second handle supports.

According to yet another preferred embodiment of the invention, the container includes a lightweight blow-molded body, including integrally-formed bottom wall and side walls, the upper end of the side walls around the periphery thereof defining a mouth for receiving refuse, for receiving and supporting a lid. A solid, rigid, integrally-formed compression-molded lip extends around the periphery of the container adjacent the mouth for providing rigidity and strength to the mouth and upper end of the side walls.

According to yet another preferred embodiment of the invention, the lip extends laterally outwardly from the side walls of the container and is adapted to support the lid on top of the container.

According to yet another preferred embodiment of the invention, the upper periphery of the side walls of the container comprises a blow-molded rim.

According to yet another preferred embodiment of the invention, the blow-molded rim extends along the plane of the side walls.

According to yet another preferred embodiment of the invention, the container includes an integrally-formed blow-molded saddle adjacent an upper front side of the container for receiving a lifting apparatus by which the container is lifted and emptied.

According to yet another preferred embodiment of the invention, the saddle comprises a recess extending inwardly and upwardly towards the mouth of the container.

According to yet another preferred embodiment of the invention the saddle extends inwardly and upwardly towards the mouth of the container and behind the compression-molded lip.

According to yet another preferred embodiment of the invention, the lip supports the lid on rear and opposing sides of the container, and the lip is vertically offset on at least a portion of a front side of container to a point below the position of the lid when closed, and defines a space between the lip and the lid when closed to permit hand access under the edge of the lid for lifting the lid.

According to yet another preferred embodiment of the invention, the container includes an integrally-formed blow molded handle extending outwardly from a rear side of the container.

According to yet another preferred embodiment of the invention, the container includes a blow-molded annular axle journal integrally-formed in the bottom wall of the container, the walls of the bottom of the container defining the axle journal having a reflex angle with respect to each other being at least 250 degrees.

An embodiment of the method of constructing a refuse container according to the invention comprises the steps of blow-molding a container body having an integrally-formed bottom wall and side walls, the upper end of the side walls around the periphery thereof defining a mouth for receiving refuse, for receiving and supporting a lid. An integrally-formed blow-molded handle means extends outwardly from a rear side of the container adjacent the upper end thereof.

According to another preferred embodiment of the invention, the method includes the step of forming in the container a solid, rigid, integrally-formed compression-molded lip extending around the periphery of the container adjacent the mouth for providing rigidity and strength to the mouth and upper end of the side walls.

According to another preferred embodiment of the invention, the method includes the step of blow-molding a blow-molded rim in the upper periphery of the side walls of the container.

According to yet another preferred embodiment of the invention, the blow-molded rim extends along the plane of the side walls.

According to another preferred embodiment of the invention, the method includes the step of blow-molding an integrally-formed saddle into the container adjacent an upper front side of the container for receiving a lifting apparatus by which the container is lifted and emptied.

According to yet another preferred embodiment of the invention, the saddle comprises a recess extending inwardly and upwardly towards the mouth of the container.

According to yet another preferred embodiment of the invention, the saddle extends inwardly and upwardly towards the mouth of the container and behind the compression-molded lip.

According to yet another preferred embodiment of the invention, the lip supports the lid on front and opposing sides of the container, and the lip is vertically offset on at least a portion of a front side of container to a point below the position of the lid when closed, and defines a space between the lip and the lid when closed to permit hand access under the edge of the lid for lifting the lid.

According to another preferred embodiment of the invention, the method includes the step of blow-molding an axle journal integrally-formed in the bottom wall of the container, the walls of the bottom of the container defining the axle journal having a reflex angle with respect to each other being at least 250 degrees.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
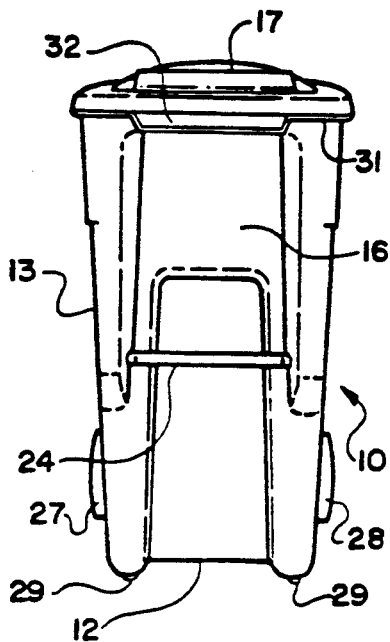
FIG. 1 is a front elevation view of a refuse container according to an embodiment of the invention.
Figure 2:
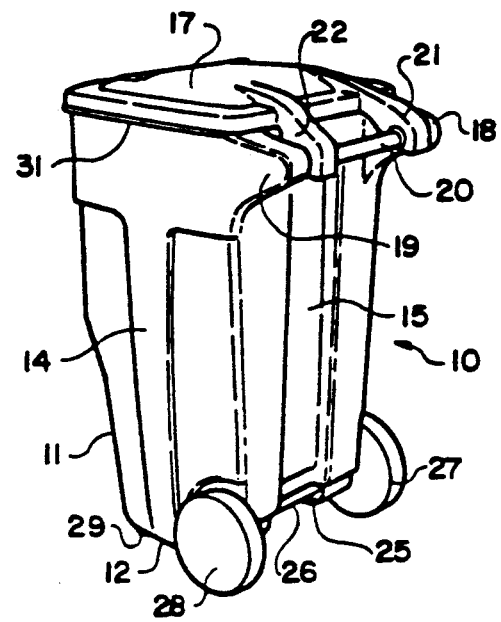
FIG. 2 is a rear quarter perspective view of the refuse container shown in FIG. 1.
Figure 3:
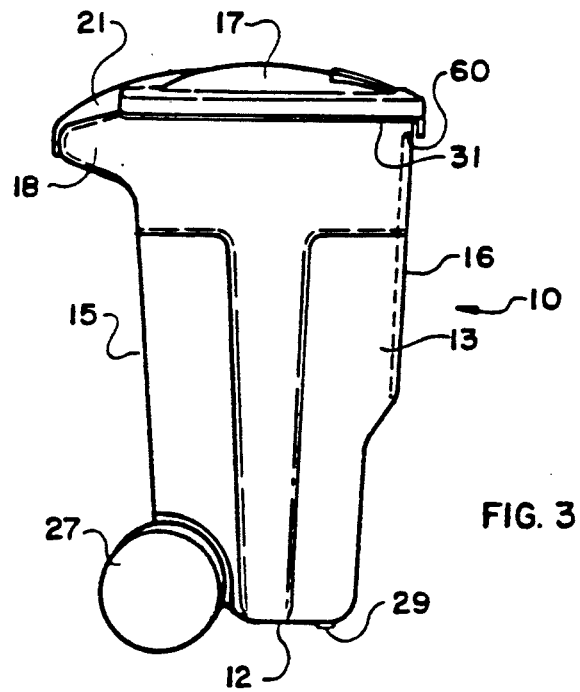
FIG. 3 is a side elevation view of the refuse container shown in FIG. 1.

Referring now specifically to the drawings, a refuse container embodying the present invention is illustrated in FIGS. 1 through 5, and shown generally at reference numeral 10. In the description that follows, reference is made to the novel features of the invention as illustrated in connection with three sizes and styles of containers. All of the features illustrated, even though only in relation to one size or style of container, are equally applicable to all styles and sizes disclosed in this application, and o other containers not shown according to the principles described herein. Of course, the principles of the invention are not limited to any particular sized container.

The term "refuse container" is used in this application in the broad sense to refer to a container useful for receiving garbage, trash, recyclable items such as paper, bottles, cans, and the like, medical disposables, laundry or other bulk items or products. The particular embodiments disclosed in this application are suitable for the above purposes, and are provided with wheels.

Container 10 is fabricated of medium to high density polyethylene with an nominal wall thickness of 0.130 inches (0.33 cm.). Container 10 is blow-molded in order to achieve maximum utilization of raw materials, and to create a light weight and strong container.

In general, the blow molding process is carried out by extruding a hollow, tubular-shaped, thermoplastic preform, referred to as a "parison", from an extrusion machine into the interior of an open mold. The walls of the mold are then closed and a gas, such as air, is blown into the mold and into the preform. The expansion of the gas under pressure causes the preform to expand and move outwardly against the interior walls of the mold. The shape of the interior walls of the mold define the shape of the product to be molded, and the thickness of the product can be controlled by controlling the shape and size of the parison. As is disclosed below, protrusions, which may be internal or external to the body of the product being molded, provide strength and rigidity to the product. Wall thickness and distribution of the material throughout the product is controlled by the design of the extrusion nozzle.

Blow-molded container 10 has an integrally-formed body 11 which includes a bottom wall 12, opposed side walls 13 and 14, a rear wall 15 and a front wall 16. The volume enclosed by the container 10 is sufficient to hold approximately 35 gallons (132 liters). As is illustrated, the walls 13–16 are provided with relief areas which provide stiffening to the relatively thin walls.

Figure 4:
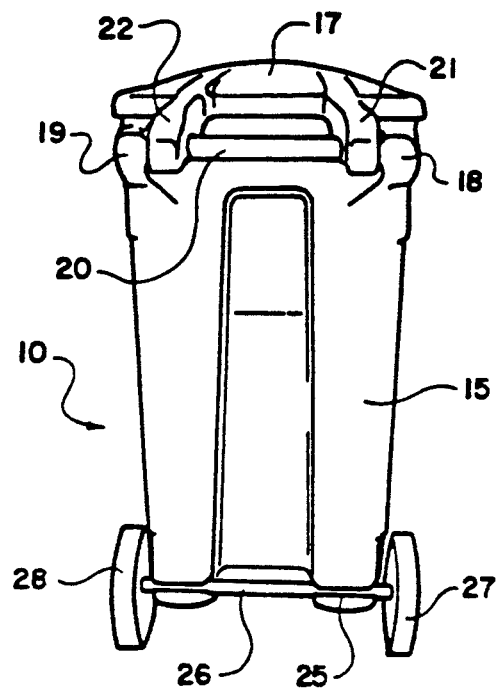
FIG. 4 is a rear elevation view of the refuse container shown in FIG. 1.
Figure 5:
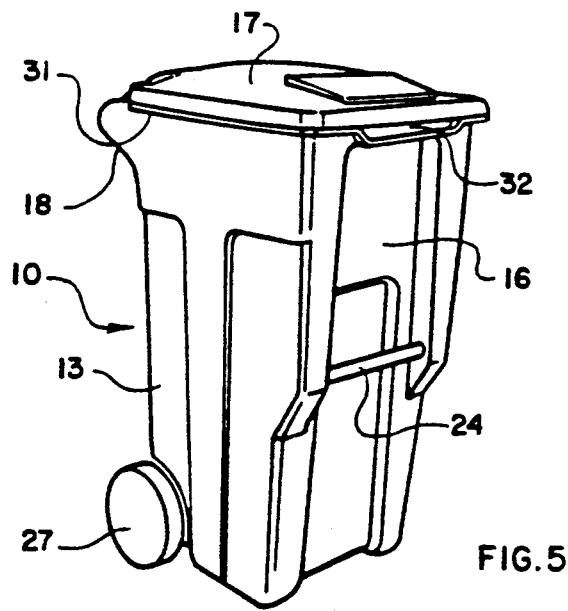
FIG. 5 is a front quarter perspective view of the refuse container shown in FIG. 1.

The walls 13–16 terminate to form a container mouth which is covered by a pivotal, hinged lid 17. Handle supports 18 and 19 are molded into the container body 11 adjacent the upper ends of the walls 13–16. These handle supports 18 and 19 are also blow-molded and are integrally-formed with and at the same time as the formation of the container body 11. The handle supports 18 and 19 support a laterally-extending and integrally-formed cylindrical handle bar 20 which is also blow-molded. As is generally shown in FIGS. 1 and 4, lid 17 is attached to handle bar 20 by hinge means, which comprise first and second hinges 21 and 22 which extend outwardly from the rear side of lid 17. Hinges 21 and 22 are integrally-molded into lid 17, and as is shown in particular in FIGS. 2, 3 and 4, extend into the lid 17 itself and provide reenforcement to lid 17.

The front wall of container 10 is provided with a laterally-extending metal lock bar 24 which is fitted to the container 10 and permits emptying by a lifting machine.

The bottom of the rear wall 15 includes an integrally-formed axle journal 25 which receives an axle 26 on which is mounted wheels 27 and 28.

The bottom 12 of container 10 includes a pair of plastic feet 29 which protect the bottom of the front end of the container 10 from abrasion and other wear-related damage. Plastic feet 29 are positioned by a snap fit in small holes which are molded in the bottom 12 during the molding of the container 10.

Figure 11:
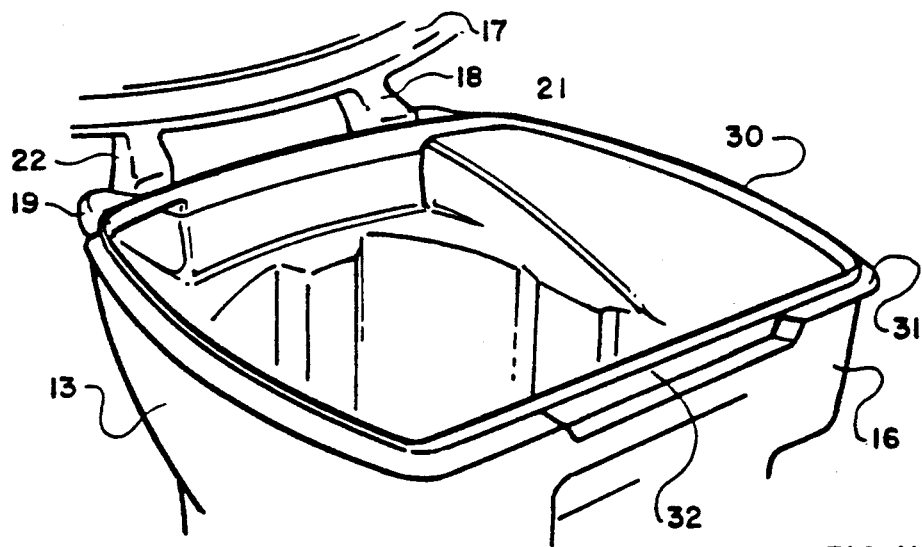
FIG. 11 is a fragmentary perspective view of the mouth area of the container shown in FIG. 1, illustrating the hollow, integrally-formed handles and the compression-formed lip.

As is shown in FIG. 11, the mouth of the container 10 is defined by an upwardly-extending rim 30 which is blow-molded and provides a means of correctly positioning lid 17 onto the top of container 10. Rim 30 is a part of and lies in the plane of the respective walls of the container 10.

A reenforcing lip 31 extends laterally outwardly from a position just below the rim 30. This reenforcing lip 31 is compression molded at the same time as the blow-molding of the container 10 takes place. Auxiliary mold pieces in the blow molding apparatus come together at precisely the right time to trap a sufficient amount of molten plastic to form the lip 31. These auxiliary mold pieces compress the plastic thus trapped into a solid, rigid mass as shown in FIG. 11. Lip 31 extends around the periphery of container 10. The lip 31 on the front wall 16 is offset downwardly away from the mouth of container 10 to form a hand access area 32, so that a hand can be extended up under lid 17 in order to open it. See also FIG. 8.

Lid 17 is blow-molded and is provided with double panel walls 35 and 36. The panel wall 35 comprises an outer panel wall 35 and faces upwardly away from the container 10 when lid 17 is closed. See FIGS. 8 and 10. The panel wall 36 comprises an inner panel wall 36 which faces downwardly into the container 10 when lid 1 is closed. See FIGS. 6, 7 and 9. The two panel walls 35 and 36 define between them a space which varies throughout the extent of the lid 17 in a regular pattern.

Figure 6:
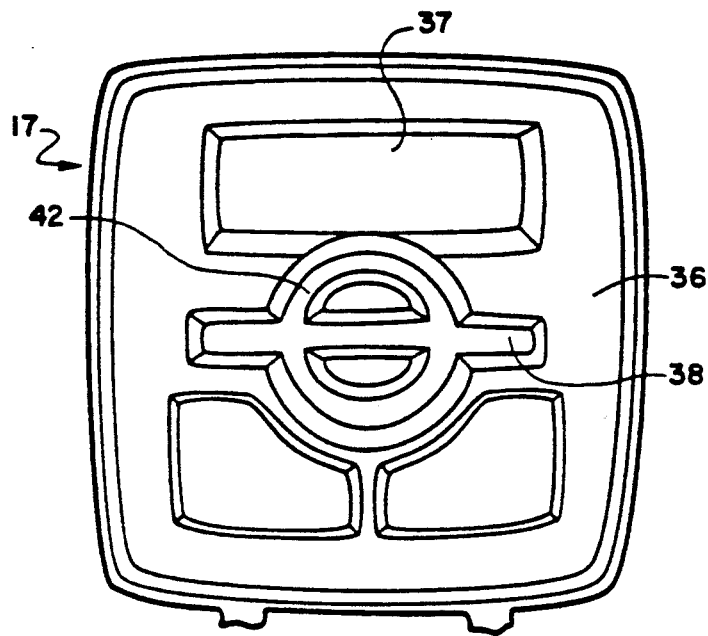
FIG. 6 is a plan view of the inner side of a container lid according to an embodiment of the invention.

As is shown in FIG. 6, the inner panel wall 36 includes a generally rectangular area 37 which can be cut out to form an access opening though the lid 17, or can be used to receive a customized imprint, such as use instructions, manufacturer or ownership information, and the like.

Figure 7:
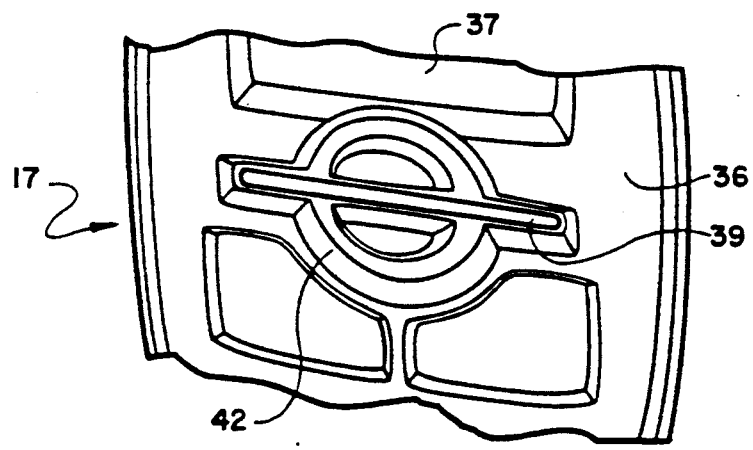
FIG. 7 is a fragmentary perspective view of the container lid shown in FIG. 6, with the slot relief area cut out to form a slot for receiving sheet material.
Figure 8:
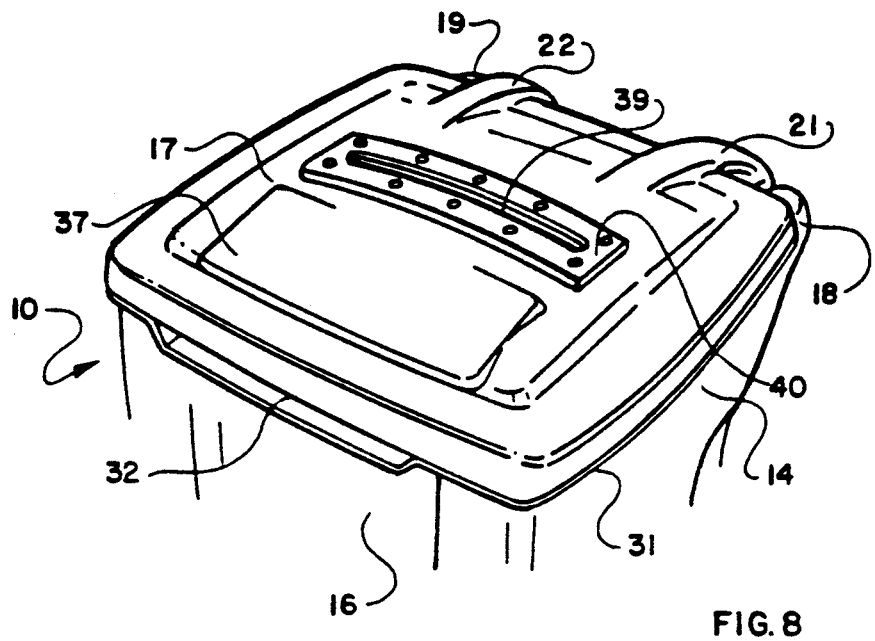
FIG. 8 is fragmentary perspective view of the container and lid, showing the slot fitted with frame.

A elongate slot-shaped relief are 38 extends from side to side in lid 17. When cut-out, as is shown in FIG. 7, relief area 38 forms a slot 39 through which sheet material such as paper can be placed into container 10 without opening lid 17. A is shown in FIG. 8, a frame 40 is placed around slot 39 and encloses the raw edges and the exposed space between outer panel wall 35 and inner panel wall 36 left when the plastic material of the lid is cut away to form slot 39. Frame 40 is secured to lid 17 by suitable fasteners, such as rivets or snap fasteners.

Figure 9:
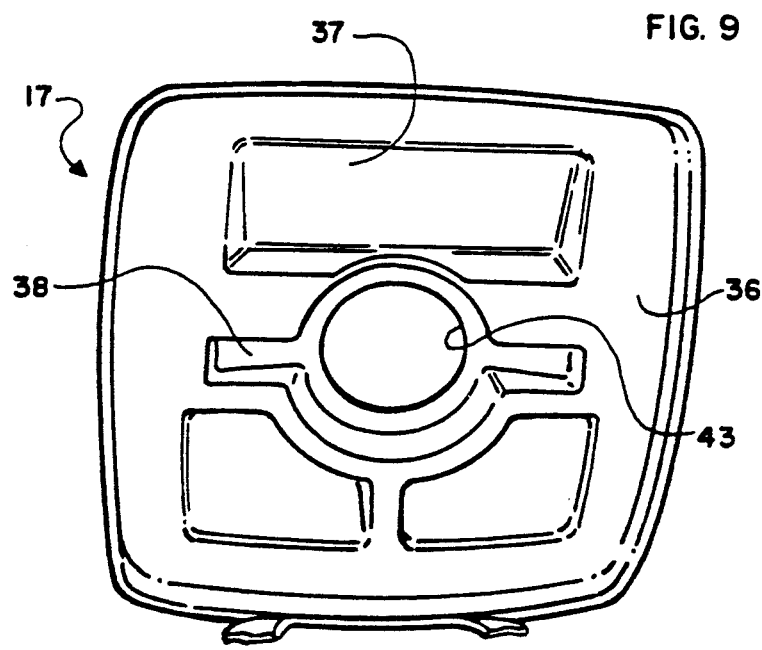
FIG. 9 is a perspective view of the inner side of the container lid shown in FIG. 6, with the annular relief area cut out to form a hole to receive objects such as cans or bottles.
Figure 10:
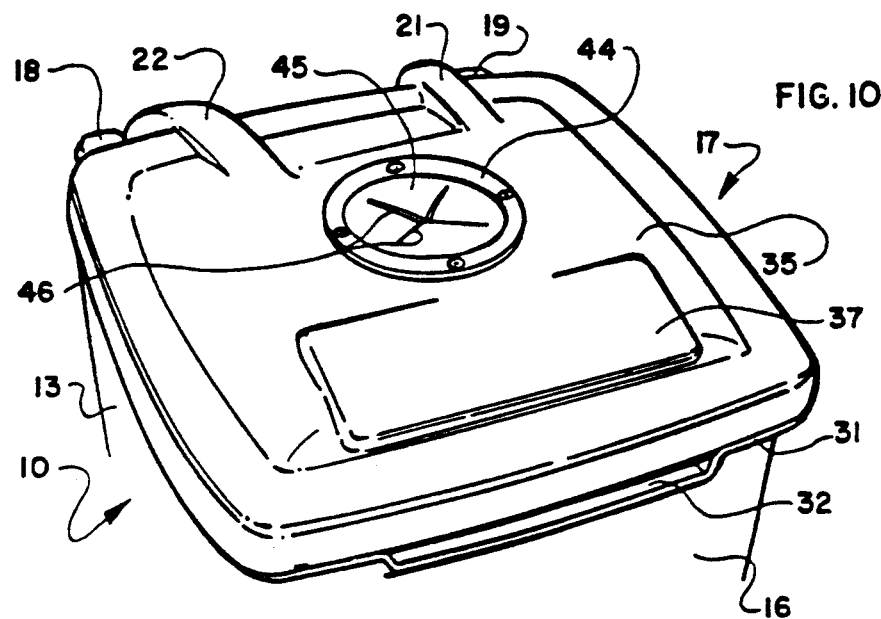
FIG. 10 is a perspective view of the outer side of the container lid shown in FIG. 6 with the hole to receive objects such as cans or bottles fitted with a frame having plastic closure flaps.

An annular relief area 42 is centrally located in lid 17. When cut-out, as is shown in FIG. 9, annular relief area 42 forms a hole 43 through which objects such as bottles, cans or anything else of a suitable size, can be placed into container 10 without opening lid 17. As is shown in FIG. 10 , a frame 44 is placed around hole 43 and encloses the raw edges and the exposed space between outer panel wall 35 and inner panel wall 36 left when the plastic material of the lid is cut away to form hole 43. Frame 44 is secured to lid 17 by suitable fasteners, such as rivets or snap fasteners. Frame 44 can suitably include a plastic or plastic flap 45 with a pair of intersecting slits 46 which permit objects to be placed into container 10 though an otherwise substantially closed opening.

Figure 12:
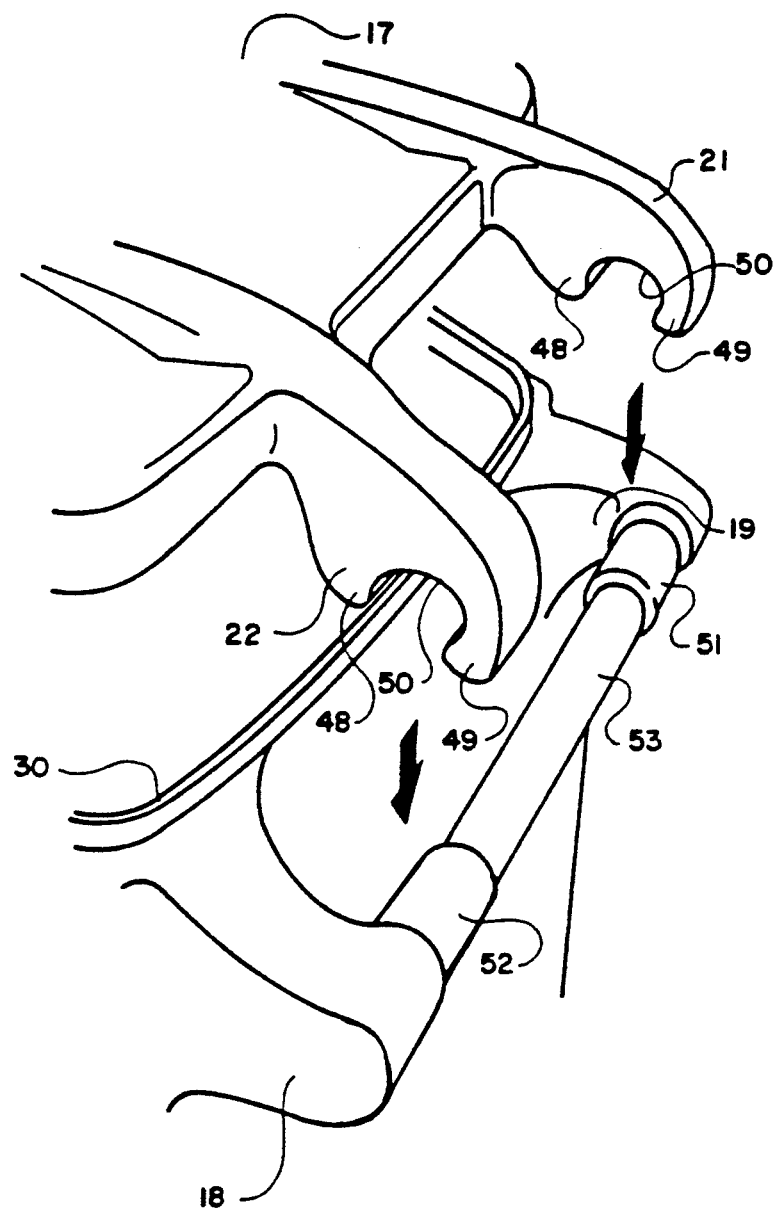
FIG. 12 is a fragmentary, exploded view showing assembly of the lid onto the handle.
Figure 13:
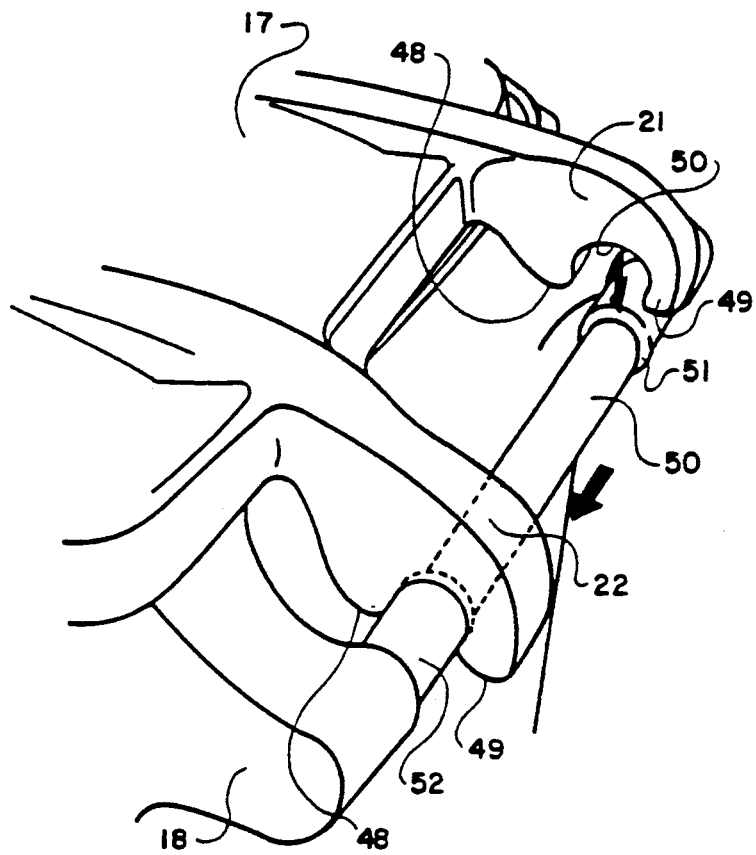
FIG. 13 is a fragmentary, exploded view showing completion of the assembly of the lid onto the handle.
Figure 14:
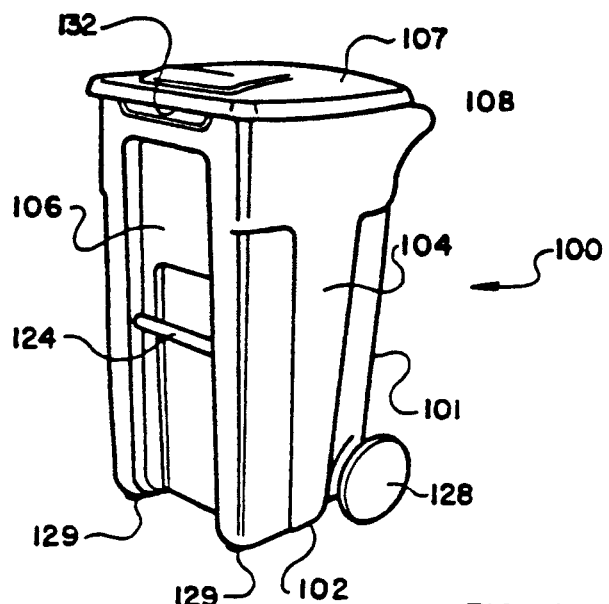
FIG. 14 is a front quarter perspective view of a refuse container according to another embodiment of the invention.
Figure 15:
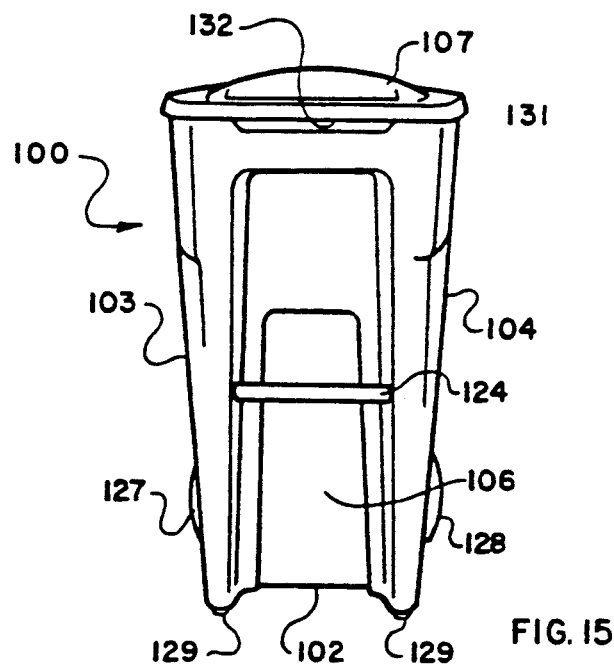
FIG. 15 is a is a front elevation view of the refuse container shown in FIG. 14.
Figure 16:
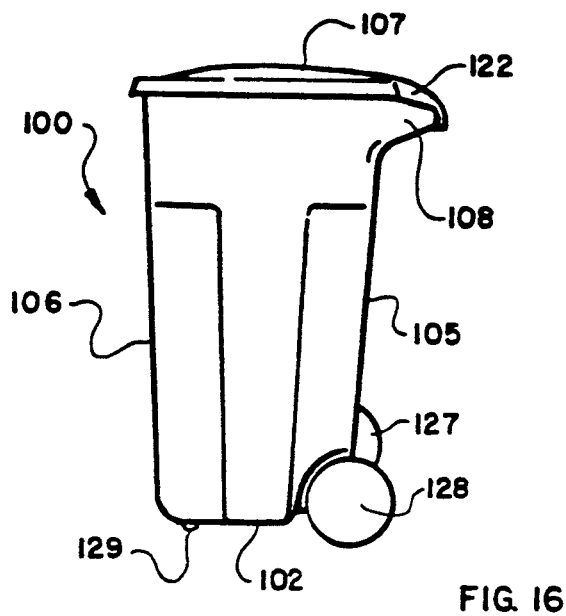
FIG. 16 is a side elevation view of the refuse container shown in FIG. 14.
Figure 17:
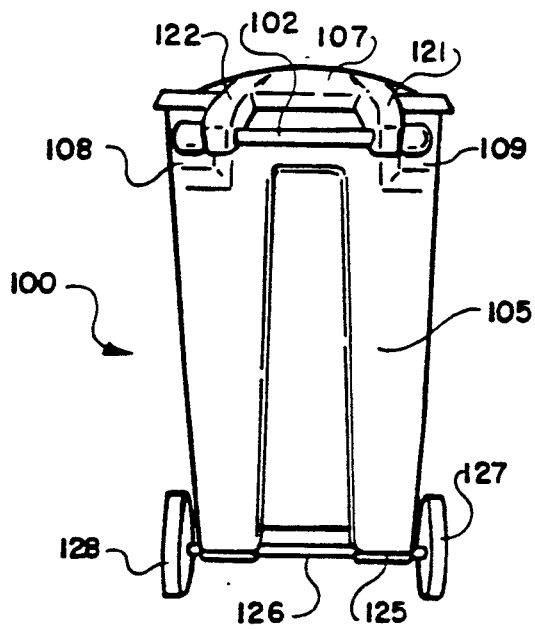
FIG. 17 is a rear elevation view of the refuse container shown in FIG. 14.
Figure 18:
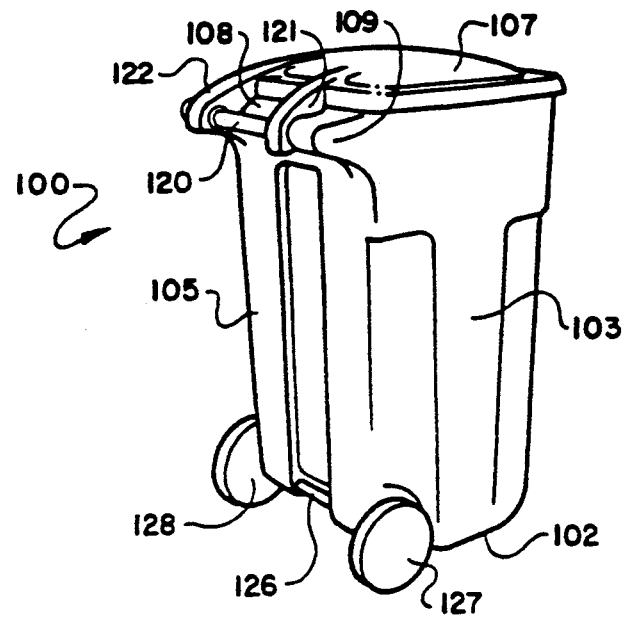
FIG. 18 is a rear quarter perspective view of the refuse container shown in FIG. 14.

Details concerning attachment of the lid 17 to the handle ba 20 are illustrated in FIGS. 12 and 13. As is shown, hinges 21 and 22 are each formed of hinge claws 48 and 49 which define an annular opening 50 therebetween. Handle bar 20 includes a pair of enlarged diameter hinge receiving areas 51 and 52 on opposite ends of handle bar 20 and a centrally-disposed gripping area 53 between hinge receiving areas 51 and 52. Hinge receiving areas 51 and 52 are sized to be received within the openings 50 of hinges 21 and 22 respectively.

The distance between hinge claws 48 and 49 is somewhat restricted, so that hinges 21 and 22 must be snapped over the hinge-receiving areas 51 and 52. This may be done by placing the hinges 21 and 22 directly over the respective hinge receiving areas 51 and 52, and forcing the hinge claws 48 and 49 of hinges 21 and 22 down onto hinge receiving areas 51 and 52, as is shown in FIG. 12. Once the hinges 21 and 22 are in place, lid 17 can be opened and closed, the lid 17 pivoting about the axis defined by handle bar 20.

Another method of installing lid 17 on container 10 is illustrated in FIG. 13. The gripping area 53 is reduced in diameter so that the hinge claws 48 and 49 of hinges 21 and 22 will fit downwardly onto the gripping area 53 without having to snap them into place. The lid 17 can be installed more quickly and with less energy by placing the hinge 22 onto handle bar 20 over the gripping area 53, and then sliding the hinge 22 onto the hinge receiving area 52. This positions hinge 21 directly over the hinge receiving area 51. Then the hinge 21 is forced downwardly over the hinge receiving area 51 as described above. Thus, only one hinge need be placed onto the handle bar 20 by application of force.

Referring again to FIG. 3, a recessed saddle area 60 is integrally-formed into the front wall 16 of container 10. Saddle area 60 extends inwardly and upwardly towards the mouth of the container 10, and works with the lock bar 24 when the container is being lifted by a lifting unit. The container 10 is thus locked onto the cart engaging plates of the lifting unit to permit the container 10 to be securely lifted and inverted.

Referring now to FIGS. 14-26, a container 100 is illustrated. container 100 is designed similarly to the container 10 illustrated in FIGS. 1-13 and contains the same features discussed above. As is illustrated in FIGS. 14-18, container 100 is fabricated of medium to high density polyethylene with an nominal wall thickness of 0.130 inches (0.33 cm.). Container 100 is blow-molded in order to achieve maximum utilization of raw materials, and to create a light weight and strong container. Container 100 has an integrally-formed body 101 which includes a bottom wall 102, opposed side walls 103 and 104, a rear wall 105 and a front wall 106. The volume enclosed by the container 100 is sufficient to hold approximately 50 gallons (189 liters). As is illustrated, the walls 103-106 are provided with relief areas which provide stiffening to the relatively thin walls.

The walls 103-106 terminate to form a container mouth which is covered by a pivotal, hinged lid 107. Handle supports 108 and 09 are molded into the container body 101 adjacent the upper ends of the walls 103-106. These handle supports 108 and 109 are also blow-molded and are integrally-formed with and at the same time as the formation of the container body 101. The handle supports 108 and 109 support a laterally-extending and integrally-formed cylindrical handle bar 120 which is also blow-molded. As is generally shown in FIGS. 1 and 4, lid 107 is attached to handle bar 120 by hinge means, which comprise first and second hinges 121 and 122 which extend outwardly from the rear side of lid 107. Hinges 121 and 122 are integrally-molded into lid 107, and as is shown in particular in FIGS. 2, 3 and 4, extend into the lid 107 itself and provide reenforcement to lid 107.

The front wall of container 100 is provided with a laterally-extending metal lock bar 124 which is fitted to the container 100 and permits emptying by a lifting machine.

The bottom of the rear wall 105 includes an integrally-formed axle journal 125 which receives an axle 126 on which is mounted wheels 127 and 128.

The bottom 102 of container 100 includes a pair of plastic feet 129 which protect the bottom of the front end of the container 100 from abrasion and other wear-related damage. Plastic feet 129 are positioned in small holes which are molded in the bottom 102.

Figure 26:
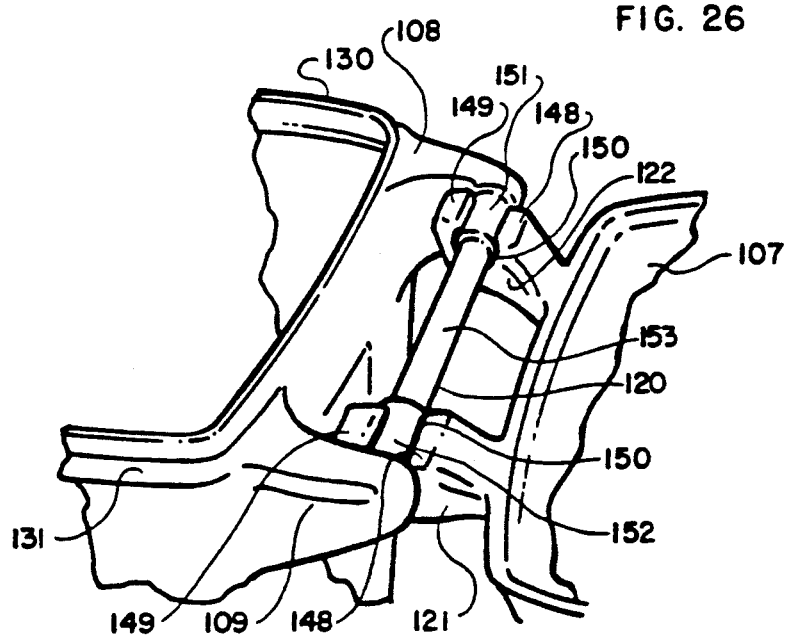
FIG. 26 is a fragmentary perspective view showing the lid hinges snap fitted onto the container handle bar.

As is shown in FIG. 26, the mouth of the container 100 is defined by an upwardly-extending rim 130 which is blow-molded and provides a means of correctly positioning lid 107 onto the top of container 100. Rim 130 is a part of and lies in the plane of the respective walls of the container 100.

A reenforcing lip 131 extends laterally outwardly from a position just below the rim 130. This reenforcing lip 131 is compression molded at the same time as the blow-molding of the container 100 takes place. Auxiliary mold pieces in the blow molding apparatus come together at precisely the right time to trap a sufficient amount of molten plastic to form the lip 131. These auxiliary mold pieces compress the plastic thus trapped into a solid, rigid mass as shown in FIG. 26. Lip 131 extends around the periphery of container 100. The lip 131 on the front wall 106 is offset downwardly away from the mouth of container 100 to form a hand access area 132, so that a hand can be extended up under lid 107 in order to open it.

Figure 21:
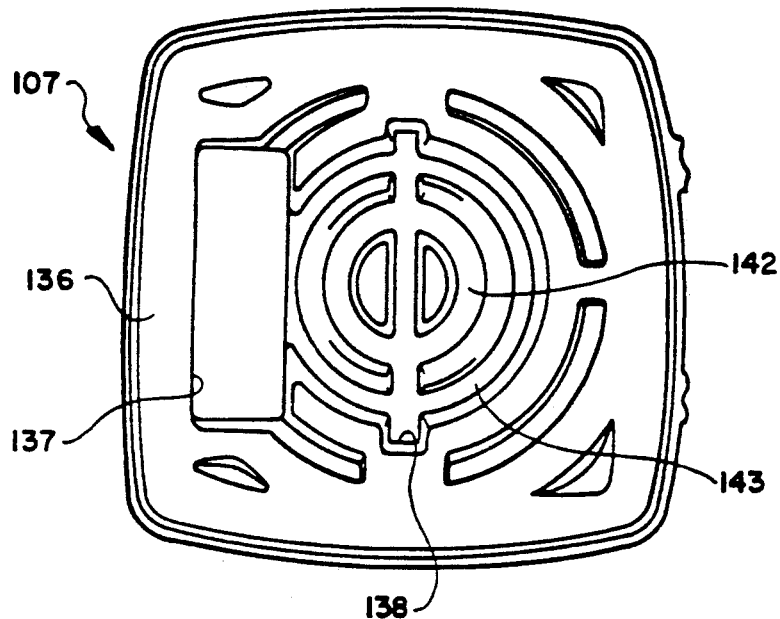
FIG. 21 is a plan view of the inner side of a container lid according to an embodiment of the invention.
Figure 22:
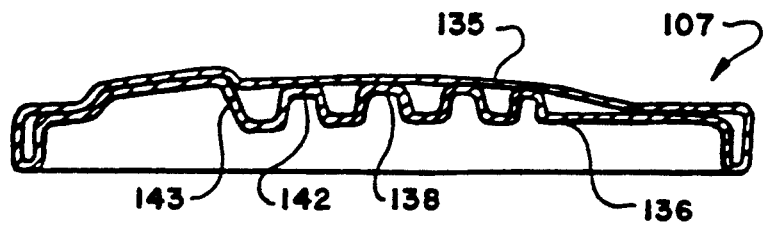
FIG. 22 is a vertical cross-section of the container lid shown in FIG. 21.

As is shown in FIGS. 21-25, lid 107 is blow-molded and is provided with double panel walls 135 and 136. The panel wall 135 comprises an outer panel wall 135 and faces upwardly away from the container 100 when lid 107 is closed. See FIGS. 24 and 25. The panel wall 136 comprises an inner panel wall 136 which faces downwardly into the container 100 when lid 107 is closed. See FIGS. 21, 22, and 23. The two panel walls 135 and 136 define between them a space which varies throughout the extent of the lid 107 in a regular pattern, as is shown in FIG. 22.

As is shown in FIG. 21, the inner panel wall 136 includes a generally rectangular area 137 which can be cut out to form an access opening though the lid 107, or can be used to receive a customized imprint, such as use instructions, manufacturer or ownership information, and the like.

Figure 25:
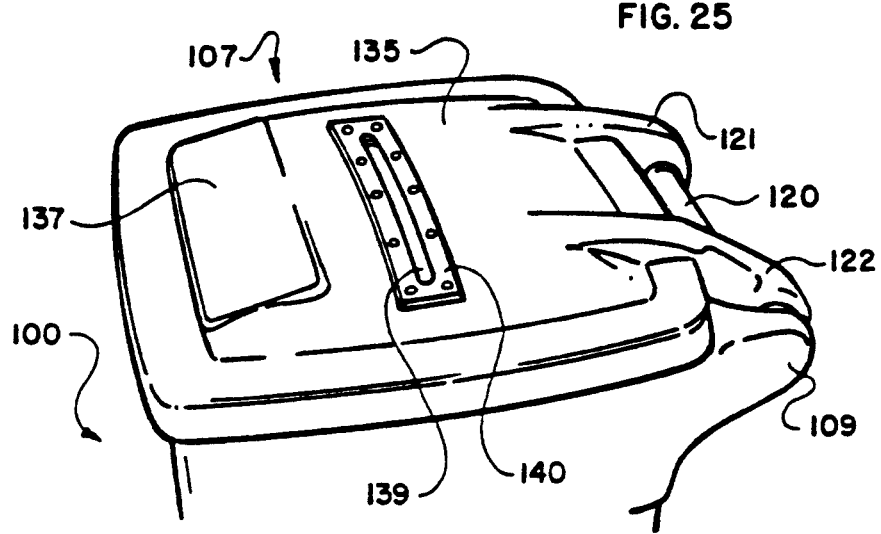
FIG. 25 is a perspective view of the outer side of the container lid shown in FIG. 23 with the slot cut out and fitted with a frame.

A elongate slot-shaped relief area 138 extends from side to side in lid 107. When cut-out, as is shown in FIG. 25, relief area 138 forms a slot 139 through which sheet material such as paper can be placed into container 100 without opening lid 107. A frame 140 is placed around slot 139 and encloses the raw edges and the exposed space between outer panel wall 135 and inner panel wall 136 left when the plastic material of the lid 107 is cut away to form slot 139. Frame 140 is secured to lid 107 by suitable fasteners, such as rivets or snap fasteners.

Figure 23:
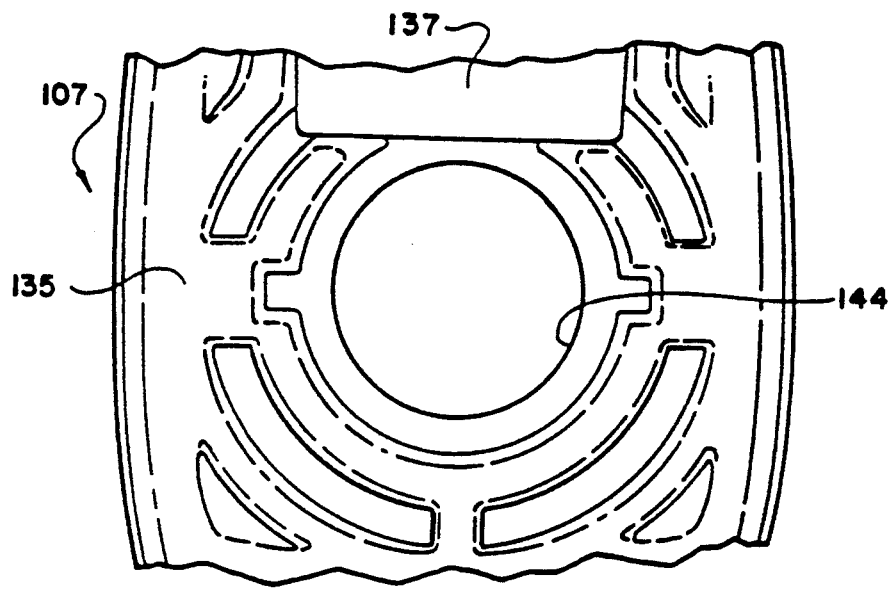
FIG. 23 is a fragmentary view of the lid shown in FIG. 21 showing a hole cut out to receive objects.
Figure 24:
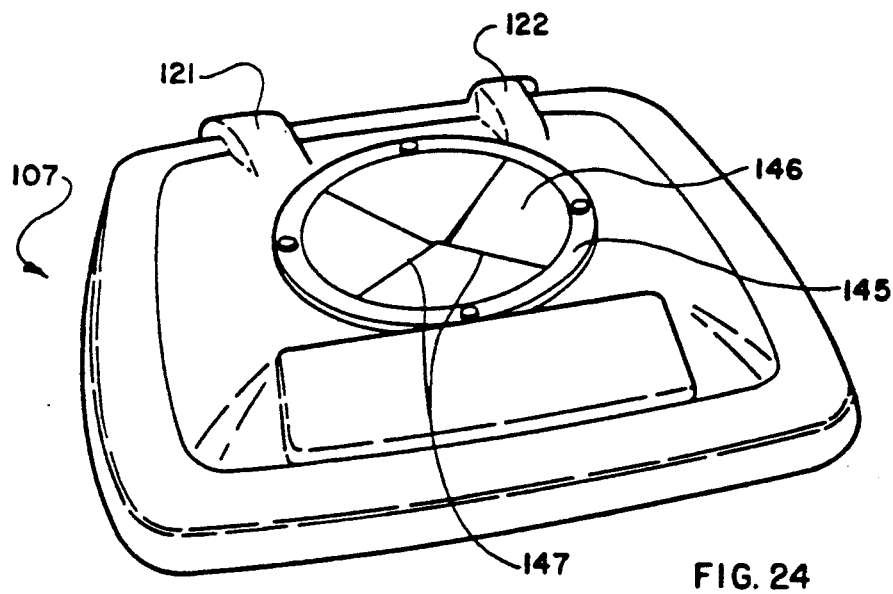
FIG. 24 is a perspective view of the lid shown in FIGS. 21-23 with a frame fitted into the hole.

A pair of annular relief areas 142 and 143 are concentrically located in lid 107. See FIG. 21. When cut-out, as is shown in FIG. 23, annular relief area 142 forms a hole 144 through which objects such as bottles, cans or anything else of a suitable size, can be placed into container 100 without opening lid 107. As is shown in FIG. 24, a frame 145 is placed around hole 144 and encloses the raw edges and the exposed space between outer panel wall 135 and inner panel wall 136 left when the plastic material of the lid is cut away to form hole 144. Frame 145 is secured to lid 107 by suitable fasteners, such as rivets or snap fasteners. Frame 145 can suitably include a rubber or plastic flap 146 with a pair of intersecting slits 147 which permit objects to be placed into container 100 though an otherwise substantially closed opening.

Attachment of the lid 107 to the handle bar 120 is illustrated in FIG. 26. Attachment is substantially as described above with reference to container 10 and is not described further. Hinges 121 and 122 are each formed of hinge claws 148 and 149 which define an annular opening 150 therebetween. Handle bar 120 includes a pair of enlarged diameter hinge receiving areas 151 and 152 on opposite ends of handle bar 120 and a centrally-disposed gripping area 153 between hinge receiving areas 151 and 152. Hinge receiving areas 151 and 152 are sized to be received within the openings 150 of hinges 121 and 122 respectively.

The distance between hinge claws 148 and 149 is somewhat restricted, so that hinges 121 and 122 must be snapped over the hinge-receiving areas 151 and 152. This may be done by placing the hinges 121 and 122 directly over the respective hinge receiving areas 151 and 152, and forcing the hinge claws 148 and 149 of hinges 121 and 122 down onto hinge receiving areas 151 and 152, as is shown in FIG. 12. Once the hinges 121 and 122 are in place, lid 107 can be opened and closed, the lid 107 pivoting about the axis defined by handle bar 120.

Figure 19:
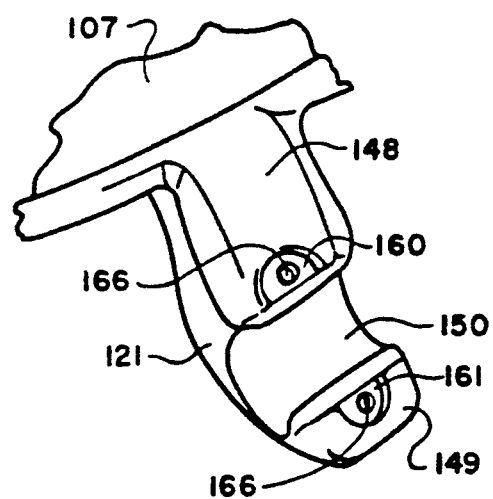
FIG. 19 is an enlarged fragmentary perspective view of the underside of a hinge showing the hinge claw and the recess for receiving the strap which locks the handle bar in place.
Figure 20:
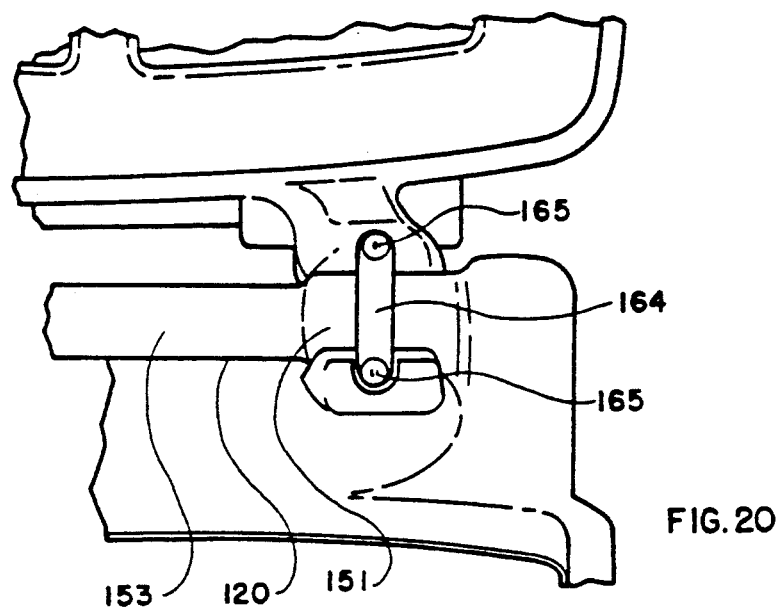
FIG. 20 is a fragmentary perspective view showing the strap in place over the snap fitted hinge claws.

The method of installing the lid as illustrated in FIG. 13 is also applicable to the construction shown in FIG. 26. As is shown in FIG. 19, the hinges may include a pair of opposed semicircular recesses 160 and 161 molded into the hinge claws 148 and 149. As is shown in FIG. 20, after the handle bar 120 has been snap fitted into the hinge opening 150, a plastic strap 164 is fitted into place over the exposed side of hinge receiving area 151 of handle bar 120. Strap 164 is held in place by a pair of rivets or snap fasteners 165 which are snapped into holes 166 in the respective hinge claws 148 and 149. The use of the plastic strap 164 is optional, depending upon use requirements.

Referring now to FIGS. 27-35, a container 200 is illustrated. Container 200 is designed similarly to the container 10 illustrated in FIGS. 1-13 and the container 100 illustrated in FIGS. 14-26 and contains many of the same features discussed above. As is illustrated in FIGS. 27-30, container 200 is fabricated of medium to high density polyethylene with an nominal wall thickness of 0.140 inches (0.355 cm.). Container 200 is blow-molded in order to achieve maximum utilization of raw materials, and to create a light weight and strong container. Container 200 has an integrally-formed body 201 which includes a bottom wall 202, opposed side walls 203 and 204, a rear wall 205 and a front wall 206. The volume enclosed by the container 200 is sufficient to hold approximately 70 gallons (265 liters). As is illustrated, the walls 203-206 are provided with relief areas which provide stiffening to the relatively thin walls.

Figure 28:
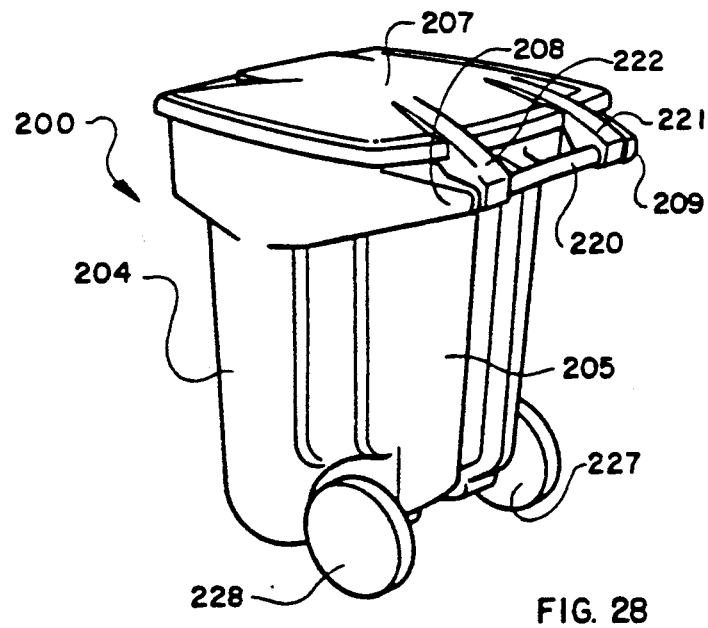
FIG. 28 is a rear quarter perspective view of the refuse container shown in FIG. 27.
Figure 29:
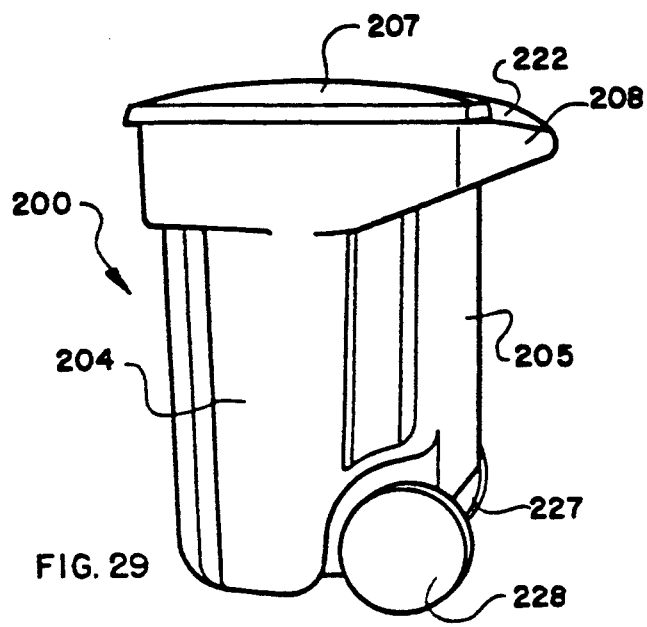
FIG. 29 is a side elevation view of the refuse container shown in FIG. 27.
Figure 30:
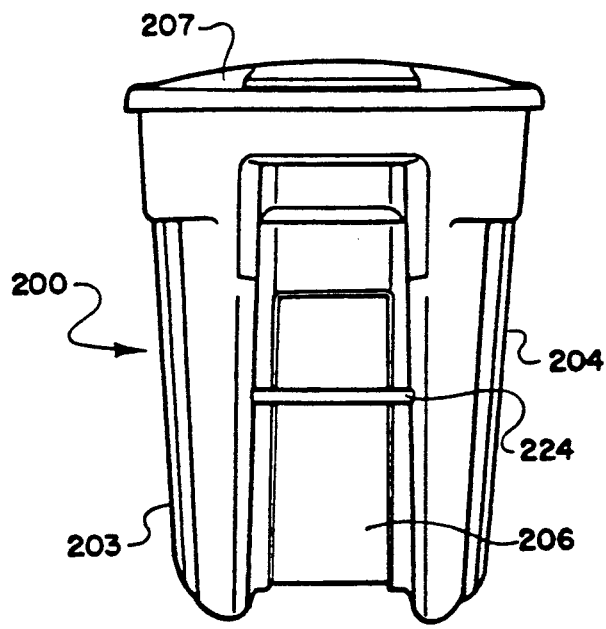
FIG. 30 is a front elevation view of the refuse container shown in FIG. 27.
Figure 31:
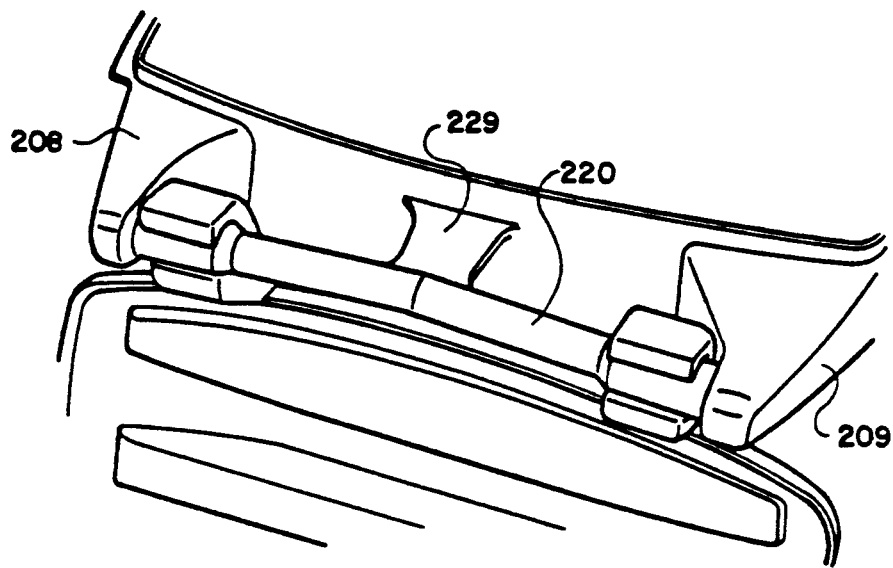
FIG. 31 is a fragmentary perspective view showing the lid hinges snap fitted onto the container handle bar and the center supporting web.

The walls 203-206 terminate to form a container mouth which is covered by a pivotal, hinged lid 207. Handle supports 208 and 209 are molded into the container body 201 adjacent the upper ends of the walls 203-206. These handle supports 208 and 209 are also blow-molded and are integrally-formed with and at the same time as the formation of the container body 201. The handle supports 208 and 209 support a laterally-extending and integrally-formed cylindrical handle bar 220 which is also blow-molded. As is generally shown in FIGS. 28 and 31, lid 207 is attached to handle bar 220 by hinge means, which comprise first and second hinges 221 and 222 which extend outwardly from the rear side of lid 207. As is also shown, the large size of the container 200 increases the span of the handle bar 220 between hinges 221 and 222. For this reason, an integrally-formed supporting web 229 extends outwardly from the rear wall 205 of container 200 and attaches to the handle bar 220 intermediate its ends, and prevents bending of the handle bar 220 which might otherwise result from extreme loading on the center of the handle bar 220. Hinges 221 and 222 are integrally-molded into lid 207, and as is shown in particular in FIG. 28 extends into the lid 207 itself and provide reenforcement to lid 207.

Figure 27:
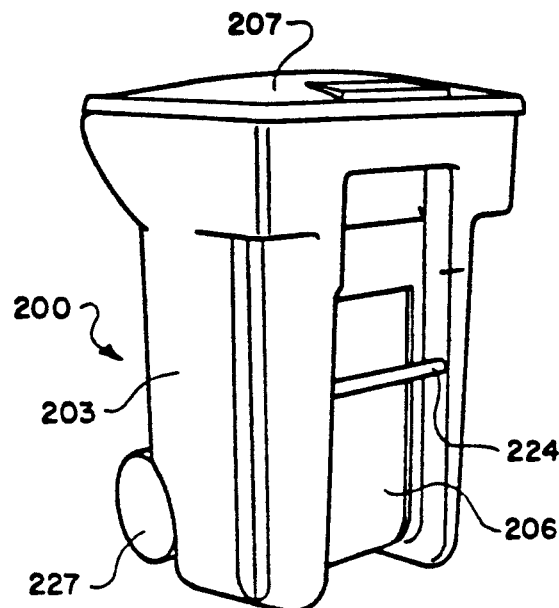
FIG. 27 is a front quarter perspective view of a refuse container according to another embodiment of the invention.

The front wall of container 200 is provided with a laterally-extending metal lock bar 224 which is fitted to the container 200 and permits emptying by a lifting machine, as is shown in FIG. 27.

Figure 32:
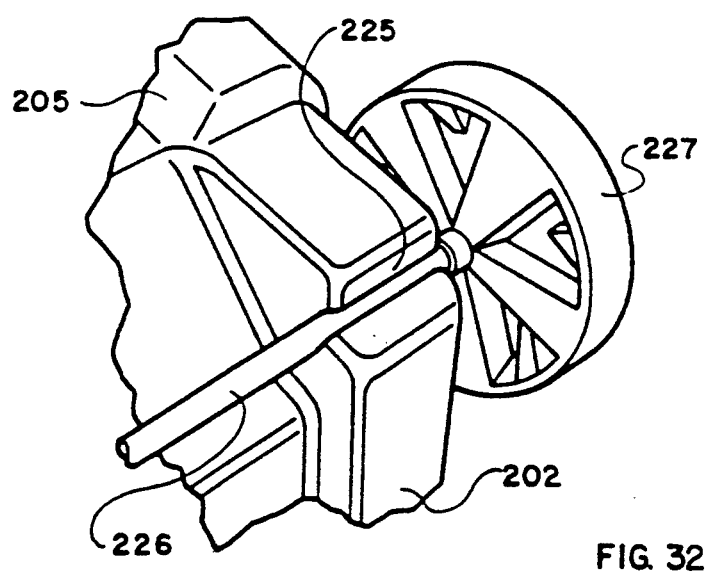
FIG. 32 is a fragmentary perspective view showing the blow-molded axle journal of the container.
Figure 33:
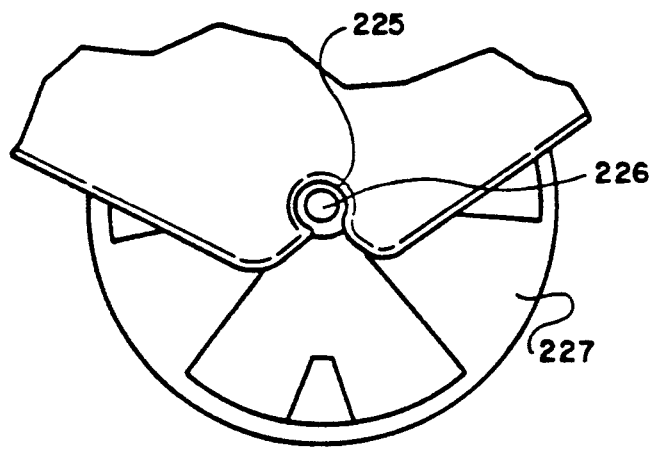
FIG. 33 is a fragmentary side elevation showing the wheel and axle snap fitted into the axle journal.

As is shown in FIG. 32, the bottom of the rear wall 205 includes an integrally-formed axle journal 225 which receives an axle 226 on which is mounted wheels 227 and 228. As is shown in FIGS. 32 and 33, the axle journal 225 defines an opening which accommodates the diameter of the axle 226, but with restricted space for access so that the axle 226 must be snapped into the opening. This feature insures secure attachment of the axle 226 and wheels 227 and 228 to the container. The reflex angle, that is, the degree of arc accommodated by the body of the container 200, is approximately 250-260 degrees. This is shown in FIG. 33.

As is shown in FIG. 31, the mouth of the container 200 is defined by an upwardly-extending rim 230 which is blow-molded and provides a means of correctly positioning lid 207 onto the top of container 200. Rim 230 is a part of and lies in the plane of the respective walls of the container 200.

A reenforcing lip 231 extends laterally outwardly from a position just below the rim 230. This reenforcing lip 231 is compression molded at the same time as the blow-molding of the container 200 takes place. Auxiliary mold pieces in the blow molding apparatus come together at precisely the right time to trap a sufficient amount of molten plastic to form the lip 231. These auxiliary mold pieces compress the plastic thus trapped into a solid, rigid mass as shown in FIG. 26.

As is shown in FIGS. 21-25 with reference to container 100, lid 207 of container 200 is also blow-molded and is provided with double panel walls 235 and 236. The lid 207 is constructed identically to lid 17 and 17, except for size and the exact shape needed to mate with the mouth of container 200.

Attachment of the lid 207 to the handle bar 220 is illustrated in FIGS. 28 and 31. Attachment is substantially as described above with reference to containers 10 and 100 and is not described further. Hinges 221 and 222 are each formed of hinge claws 248 and 249 which define an annular opening 250 therebetween. Handle bar 220 includes a pair of enlarged diameter hinge receiving areas 251 and 252 on opposite ends of handle bar 220 and a centrally-disposed gripping area 253 between hinge receiving areas 251 and 252. Hinge receiving areas 251 and 252 are sized to be received within the openings 250 of hinges 221 and 222 respectively.

The distance between hinge claws 248 and 249 is somewhat restricted, so that hinges 221 and 222 must be snapped over the hinge-receiving areas 251 and 252. This may be done by placing the hinges 221 and 222 directly over the respective hinge receiving areas 151 and 152, and forcing the hinge claws 248 and 249 of hinges 221 and 222 down onto hinge receiving areas 251 and 252, as is shown in FIG. 31. Once the hinges 221 and 222 are in place, lid 207 can be opened and closed, the lid 207 pivoting about the axis defined by handle bar 220.

The methods of installing the lid as illustrated in FIGS. 13 and 19 are also applicable to the construction shown in FIG. 31.

Figure 34:
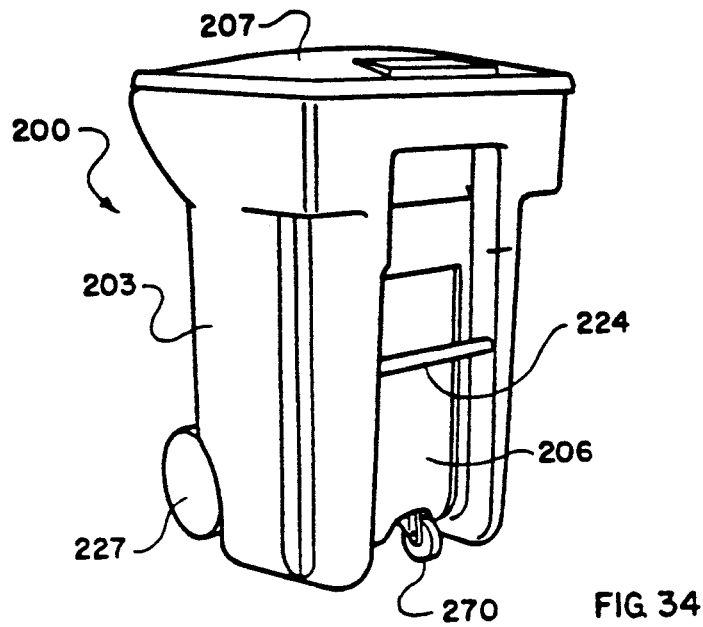
FIG. 34 is a front quarter perspective view of a refuse container according to another embodiment of the invention, with a front caster wheel.
Figure 35:
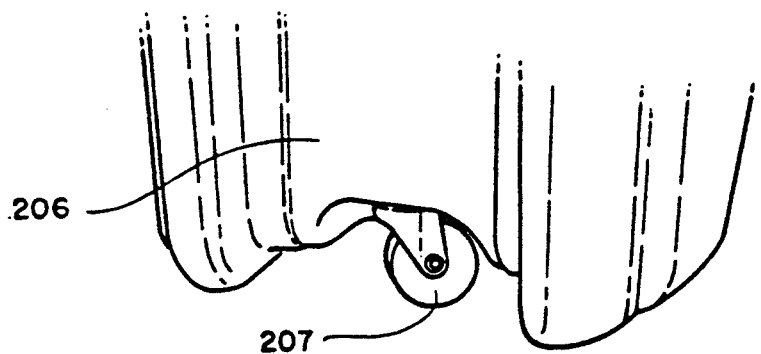
FIG. 35 is an enlarged fragmentary view of the caster wheel arrangement of FIG. 34.

As is shown in FIGS. 34 and 35, a caster wheel 270 may be installed in the bottom 202 of container 200, adjacent the front wall 206. With larger containers such as container 200, the caster wheel 270 permits the container 200 to be rolled without tilting the container 200 back on its rear wheels 227, 228.

A blow molded container and lid is described above. Various details of the invention may be changed without departing from its scope. Furthermore, the foregoing description of the preferred embodiment of the invention and the best mode for practicing the invention are provided for the purpose of illustration only and not for the purpose of limitation--the invention being defined by the claims.

We claim:

1. An integrally formed, blow molded refuse characterized durability light weight, said refuse container comprising:
    (a) a lightweight blow-molded body, including integrally-formed bottom wall and side walls, the upper end of said side walls around the periphery thereof defining a mouth for receiving refuse, and for receiving and supporting a lid;
    (b) an integrally-formed blow-molded handle means extending outwardly from a rear side of said container adjacent the upper end thereof, comprising
    (c) first and second spaced-apart hollow handle supports, opening to the body interior, formed adjacent the side edges of the rear side of the container; (d) a hollow handle bar integrally-formed with and extending between said first and second handle supports; (e) a solid, rigid, integrally formed compression-molded lip extending around the periphery of the container adjacent the mouth for providing rigidity and strength to the mouth and the upper end of the sidewalls, said sidewalls, said hollow handle supports, and said hollow handle bar being substantially equal in thickness.

2. A refuse container according to claim 1, and including a supporting web extending between the rear wall of the container and the handle bar intermediate said first and second handle supports.

3. A refuse container according to claim 1, wherein said lip extends laterally outwardly form the side walls of the container and is adapted to support the lid on top of the container.

4. A refuse container according to claim 3, and wherein the upper periphery of the side walls of the container comprises a blow-molded rim.

5. A refuse container according to claim 4, wherein said blow-molded rim extends along the plane of the side walls.

6. A refuse container according to claim 1, and including an integrally-formed blow-molded saddle adjacent an upper front side of the container for receiving a lifting apparatus by which the container is lifted and emptied.

7. A refuse container according to claim 6, wherein said saddle comprises a recess extending inwardly and upwardly towards the mouth of the container.

8. A refuse container according to claim 7, wherein said saddle includes the compression-molded lip, and extends inwardly and upwardly towards the mouth of the container.

9. A refuse container according to claim 1, wherein said lip supports the lid on rear and opposing sides of the container, and wherein said lip is vertically offset on at least a portion of a front side of container to a point below the position of the lid when closed, and defines a space between the lip and the lid when closed to permit hand access under the edge of the lid for lifting the lid.

10. A refuse container according to claim 1, and including an integrally-formed blow molded handle extending outwardly from a rear side of the container.

11. A refuse container according to claim 1, and including a blow-molded annular axle journal integrally-formed in the bottom wall of the container, the walls of the bottom of the container defining the axle journal having a reflex angle with respect to each other being at least 250 degrees.

12. A refuse container according to claim 1, and including a blow-molded annular axle journal integrally-formed in the bottom wall of the container, the walls of the bottom of the container defining the axle journal having a reflex angle with respect to each other being at least 250 degrees, and having a size to receive the axle by means of a snap fit.

* * * * *